3,004,046
PROCESS OF PREPARING 4-PREGNENE-11-OL-3,20-DIONES FROM 4-HALO-PREGNANE-3,11,20-TRIONES

John T. Day, Danville, Pa., and Charles M. Smith, Fanwood, N.J., assignors to Merck & Co., Inc., Rahway, N.J., a corporation of New Jersey
No Drawing. Continuation of application Ser. No. 481,018, Jan. 10, 1955. This application Feb. 24, 1958, Ser. No. 716,894
5 Claims. (Cl. 260—397.45)

This invention is concerned generally with processes for the preparation of steroid compounds. More particularly, it relates to an improved method for preparing $\Delta^4$-3,20-diketo-11-hydroxy-pregnene compounds starting with the corresponding 4-halo-3,11,20-triketo-pregnane compounds. The $\Delta^4$-3,20-diketo-11-hydroxy-pregnene compounds obtained in accordance with this improved method include the adrenal hormones hydrocortisone, 9-fluorohydrocortisone, and their acetates.

This application is a continuation of application Serial No. 481,018, filed January 10, 1955, now abandoned.

Heretofore, hydrocortisone has ordinarily been prepared, starting with 21-esters of 4-halo-3,11,20-triketo-17,21-dihydroxy pregnane, by reacting the latter compound with a dehydrohalogenating agent to produce cortisone, reacting the cortisone thus obtained with an excess of semicarbazide to produce cortisone-3,20-bis-semicarbazone, reacting the latter compound with an alkali metal borohydride thereby reducing the 11-carbonyl substituent without affecting the semicarbazone linkages, and hydrolyzing the resulting hydrocortisone 3,20-bis-semicarbazone. This procedure possessed various disadvantages for commercial operation. In the first place, in order to achieve substantially quantitative conversion to the 3,20-bis-semicarbazone, it was necessary to utilize a substantial excess of semicarbazide in the reaction; even using such excess, the cortisone 3,20-bis-semicarbazone thus prepared was contaminated with appreciable quantities of monosemicarbazones and unreacted cortisone. When this product was reduced with an alkali metal borohydride, the hydrocortisone 3,20-bis-semicarbazone product was contaminated with unwanted by-products containing hydroxy substituents in the 3 and/or 20-positions of the molecule. Moreover, this prior method necessitated first preparing cortisone or its acetate as an incident in the manufacture of hydrocortisone.

It was therefore an object of this invention to provide a method for making hydrocortisone which would start with an intermediate in the cortisone process, and which would thus avoid the necessity for such preparation of cortisone. It was a further object of this invention to avoid the use of the large excess of semicarbazide which was required, in the prior method using cortisone as the starting material, in order to quantitatively form the cortisone 3,20-bis-semicarbazone.

It is now discovered, in accordance with the present invention, that $\Delta^4$-3,20-diketo-11-hydroxy-pregnene compounds can be prepared from the corresponding 4-halo-3,11,20-triketo-pregnane compounds by a method which eliminates the intermediate formation of the corresponding $\Delta^4$-3,11,20-triketo-pregnene compounds and which, at the same time, results in much higher yields based on the 4-halo-3,11,20-triketo-pregnane starting materials than were obtainable by means of the prior method.

This improved procedure comprises reacting the 4-halo-3,11,20-triketo-pregnane starting material with semicarbazide thereby forming a reaction product comprising mono- and 3,20-bis-semicarbazones of the corresponding $\Delta^4$-3,11,20-triketo-pregnene compound, fractionally crystallizing this reaction product from a solvent mixture comprising a water-immiscible organic solvent and a highly polar, water-miscible organic solvent, thereby recovering the 3,20-bis-semicarbazone of the $\Delta^4$-3,11,20-triketo-pregnene compound from said solvent mixture, reacting said 3,20-bis-semicarbazone of the $\Delta^4$-3,11,20-triketo-pregnene with an alkali metal borohydride to produce the 3,20-bis-semicarbazone of the corresponding $\Delta^4$-3,20-diketo-11-hydroxy-pregnene compound, and reacting the latter compound with a hydrolyzing agent to form the $\Delta^4$-3,20-diketo-11-hydroxy-pregnene compound.

The mother liquor from the fractional crystallization operation is likewise reacted with a hydrolyzing agent thereby hydrolyzing the mixture of mono-semicarbazones and residual 3,20-bis-semicarbazone of the $\Delta^4$-3,11,20-triketo-pregnene compound to form the $\Delta^4$-3,11,20-triketo-pregnene compound. Accordingly, since both the mono- and bis-semicarbazones of the $\Delta^4$-3,11,20-triketo-pregnene compound contained in the mother liquor undergo hydrolysis to form the $\Delta^4$-3,11,20-triketo-pregnene compound, and since the substantial purity of the 3,20-bis-semicarbazone of the $\Delta^4$-3,11,20-triketo-pregnene compound crystallized from the reaction mixture ensures a maximal conversion of this intermediate to the $\Delta^4$-3,20-diketo-11-hydroxy-pregnene compound, it will be seen that this method provides for the efficient production of such $\Delta^4$-3,20-diketo-11-hydroxy-pregnene compound while ensuring quantitative utilization of the semicarbazone products retained in the mother liquor.

In carrying out this improved method we ordinarily utilize, as starting material, a 4-halo-3,11,20-triketo-pregnane compound such as 4-halo-3,11,20-triketo-17-hydroxy-21-acyloxy-pregnane, 4-chloro-3,11,20-triketo-17-hydroxy-21-acetoxy-pregnane, 4-bromo-3,11,20-triketo-17-hydroxy-21-acetoxy-pregnane, etc. which is reacted with semicarbazide, thereby eliminating the elements of hydrogen halide from the molecule and, at the same time, replacing the 3 and/or 20-keto substituents with semicarbazone radicals. Since this replacement with semicarbazone radicals is an equilibrium reaction, the extent of semicarbazone formation is necessarily dependent upon the molar ratio of the semicarbazide to the 4-halo-3,11,20-triketo-pregnane starting material. We ordinarily utilize at least about two molecular equivalents of semicarbazide per mole of 4-halo-3,11,20-triketo-pregnane compound, and preferably about four molecular equivalents of the semicarbazide. Using this relatively small excess of semicarbazide, there is obtained a reaction product containing the 3,20-bis-semicarbazone of the $\Delta^4$-3,11,20-triketo-pregnene compound admixed with a substantial proportion of mono-semicarbazones. Whereas, in the prior method, such a reaction mixture containing both mono and bis-semicarbazones would have been unsatisfactory for preparing $\Delta^4$-3,20-diketo-11-hydroxy-pregnene compounds, our new process makes possible the utilization of this reaction mixture for producing $\Delta^4$-3,20-diketo-11-hydroxy-pregnene compounds, such as hydrocortisone, in pure form and in high yield, while providing for the employment of the remainder of the reaction mixture for the preparation of $\Delta^4$-3,11,20-triketo-pregnene compounds, such as cortisone.

The solvent mixture, utilized for fractionally crystallizing the 3,20-bis-semicarbazone of the $\Delta^4$-3,11,20-triketo-pregnene compound from the reaction product containing this 3,20-bis-semicarbazone admixed with the mono-semicarbazones of the $\Delta^4$-3,ol,20-triketo-pregnene compound, comprises a water-immiscible organic solvent and a highly polar, water-miscible organic solvent. As the water-immiscible solvent, we ordinarily employ a hydrocarbon solvent such as benzene, toluene, a halogenated hydrocarbon solvent such as chloroform, carbon tetrachloride, ethylene dichloride, chlorbenzene, and the like. The water-miscible organic solvent should be highly polar as, for example, an alcohol, preferably a lower alkanol such as methanol, ethanol, primary, secondary or tertiary butanol, isopropanol, amyl alcohol, a lower alkanoic acid nitrile such as acetonitrile, propionitrile, an N-N-dialkyl alkanoamide such as dimethyl formamide, diethyl formamide, and the like. It is preferred to employ a solvent mixture comprising chloroform as the water-immiscible solvent, and dimethyl formamide alone or mixed with methanol, as the polar, water-miscible solvent. The relative amounts of water-immiscible organic solvent and polar, water-miscible organic solvent can be varied over a relatively wide range although it has been found convenient to utilize approximately equal amounts of the two solvents in the solvent mixture. The temperatures employed for dissolving the reaction product containing the bis and mono-semicarbazones of the $\Delta^4$-3,11,20-triketo-pregnene compound, and for fractionally crystallizing the bis-semicarbazone from such solution, depend on the particular solvent mixture employed, as well as upon the concentration of the semicarbazone reaction product in such solvent mixture. Irrespective of the particular solvents, concentrations, and temperatures, we have discovered that the 3,20-bis-semicarbazone of the $\Delta^4$-3,11,20-triketo-pregnene compound selectively precipitates from such solvent mixture as a substantially pure crystalline material; it is ordinarily preferred to slowly lower the temperature of the solution containing the mixture of semicarbazones thereby effecting relatively slow crystallization whereby occlusion of the mono-semicarbazone is avoided.

The 3,20-bis-semicarbazone of the $\Delta^4$-3,11,20-triketo-pregnene compound such as $\Delta^4$-3,11,20-triketo-17,21-dihydroxy-pregnene 3,20-bis-semicarbazone, $\Delta^4$-3,11,20-triketo-17-hydroxy-21-acyloxy-pregnene 3,20-bis-semicarbazone, $\Delta^4$-3,11,20-triketo-17-hydroxy-21-acetoxy-pregnene 3,20-bis-semicarbazone, obtained in pure form in accordance with this crystallization procedure, is reacted with an alkali metal borohydride such as lithium borohydride, potassium borohydride, sodium borohydride, and the like, thereby reducing the 11-keto substituent without affecting the unsaturated carbon-nitrogen linkages in the molecule, to form the 3,20-bis-semicarbazone of the corresponding $\Delta^4$-3,20-diketo-11-hydroxy-pregnene compound such as $\Delta^4$-3,20-diketo-11,17,21-trihydroxy-pregnene 3,20-bis-semicarbazone, $\Delta^4$-3,20-diketo-11,17-dihydroxy-21-acyloxy 3,-20-bis-semicarbazone, $\Delta^4$-3,20-diketo-11,17-dihydroxy-21-acetoxy-pregnene 3,20-bis-semicarbazone, and the like. The reaction between the 3,20-bis-semicarbazone of the $\Delta^4$-3,11,20-triketo-pregnene compound and the alkali metal borohydride is ordinarily conducted in the presence of a diluent, preferably in the presence of a solvent such as tetrahydrofuran, dimethyl formamide, diethyl ether, and the like. It is ordinarily preferred to conduct the reaction in solution in either tetrahydrofuran or in dimethyl formamide. When the borohydride reduction is conducted in an aqueous diluent, ester groupings, e.g. 21-acyloxy radicals, are hydrolyzed to hydroxy.

The 3,20-bis-semicarbazone of the $\Delta^4$-3,20-diketo-11-hydroxy-pregnene compound is then reacted with a hydrolyzing agent. This hydrolysis reaction is preferably conducted by reacting the 3,20-bis-semicarbazone of the $\Delta^4$-3,20-diketo-11-hydroxy-pregnene compound with an aqueous mineral acid in contact with a separate liquid phase comprising an essentially water-immiscible organic solvent. Under these reaction conditions, the semicarbazone linkages are hydrolyzed without substantially affecting other acid-sensitive groupings, such as an acid-hydrolyzable ester radicals, present in the molecule. Thus, this method of hydrolysis is particularly adapted for hydrolyzing 3,20-bis-semicarbazones of $\Delta^4$-3,20-diketo-11,17-dihydroxy-21-oxygenated-pregnene compounds such as $\Delta^4$-3,20-diketo-11,17,21-trihydroxy-pregnene 3,20-bis-semicarbazone, $\Delta^4$-3,20-diketo-11,17-dihydroxy-21-acetoxy-pregnene 3,20-bis-semicarbazones, and the like, since the acid-sensitive dihydroxyacetone C-17 side chain in such compounds is substantially unaffected by the aqueous mineral acid during such hydrolysis reaction. Moreover, the utilization of the separate water-immiscible organic phase shifts the equilibrium reaction to substantially complete hydrolysis whereby the $\Delta^4$-3,20-diketo-11-hydroxy-pregnene compound such as $\Delta^4$-3,20-diketo-11,17,21-trihydroxy-pregnene, $\Delta^4$-3,20-diketo-11,17 - dihydroxy - 21-acetoxy-pregnene, and the like, is obtained directly in a yield approaching that theoretically obtainable.

The mother liquor remaining after the crystallization and filtration of the 3,20-bis-semicarbazone of the $\Delta^4$-3,11,20-triketo-pregnene compound therefrom is likewise reacted with a hydrolyzing agent to produce the corresponding $\Delta^4$-3,11,20-triketo-pregnene compound such as $\Delta^4$-3,11,20-triketo-17,21-dihydroxy-pregnene, $\Delta^4$-3,11,20-triketo-17-hydroxy-21-acetoxy-pregnene, and the like. This hydrolysis of the mixture of semicarbazones of the $\Delta^4$-3,11,20-triketo-pregnene compound present in the mother liquor is ordinarily conducted in accordance with the hydrolysis conditions described hereinabove for the hydrolysis of the 3,20-bis-semicarbazone of the $\Delta^4$-3,20-diketo-11-hydroxy-pregnene compound. It is a preferred feature of this invention that the solvent mixture, comprising a water-immiscible organic solvent such as chloroform and a highly polar, water-miscible organic solvent such as dimethyl formamide and methanol, utilized in fractionally crystallizing the 3,20-bis-semicarbazone of the $\Delta^4$-3,11,20-triketo-pregnene compound results in a mother liquor particularly adapted to this aqueous mineral acid hydrolysis procedure, and merely requires the addition of aqueous mineral acid solution thereto, and heating, to achieve effective hydrolysis of the mixture of mono and bis-semicarbazones of the $\Delta^4$-3,11,20-triketo-pregnene compound contained in said mother liquor.

The following examples illustrate methods of carrying out the present invention, but it is to be understood that these examples are given for purposes of illustration and not of limitation.

*Example 1*

A mixture of 8.25 g. of semicarbazide, 48.4 g. of 4-bromo - 3,11,20 - triketo - 17 - hydroxy - 21 - acetoxy-pregnene, 160 cc. of dimethyl formamide and 388 cc. of chloroform is heated under reflux in contact with a nitrogen atmosphere for a period of about fifteen minutes, and to the refluxing solution is added a solution of 24.7 g. of semicarbazide in 200 cc. of methanol. The resulting mixture is heated under reflux for an additional period of ninety minutes, and the clear reaction solution is allowed to cool slowly with agitation. At the first sign of crystal formation, which occurs at about 50° C., the agitation is stopped for a period of about fifteen minutes to allow crystal growth. Agitation is resumed and the resulting mixture is allowed to cool to about 40° C. and maintained at that temperature with agitation for a period of about two hours.

The crystalline slurry is filtered, and the crystalline material is washed with a solvent mixture consisting of 9 cc. of dimethyl formamide, 45 cc. of chloroform and 21 cc. of methanol, and dried to give substantially pure $\Delta^4$-3,11,20-triketo-17-hydroxy-21-acetoxy-pregnene 3,20-bis-semicarbazone. The mother liquor and washings from this 3,20-bis-semicarbazone are combined to give a solution containing a mixture of mono and bis-semicarbazones of $\Delta^4$-3,11,20-triketo-17-hydroxy-21-acetoxy-pregnene.

*Example 2*

Four-tenths of a gram of lithium borohydride is suspended in 20 cc. of anhydrous tetrahydrofuran and to this suspension is added, dropwise, with stirring, over a thirty-minute period, a solution of 0.88 g. of $\Delta^4$-3,11,20-triketo-17-hydroxy-21-acetoxy-pregnene, 3,20-bis-semicarbazone in 5 cc. of dimethyl-formamide and 10 cc. of tetrahydrofuran, while maintaining the temperature of the reaction mixture at about 25° C. The resulting mixture is stirred for an additional period of forty minutes at a temperature of about 25° C. About 40 cc. of a 10% aqueous solution of acetic acid is added, cautiously, with stirring, to the reaction mixture, thereby decomposing the excess lithium borohydride. The clear solution thus obtained is evaporated in vacuo nearly to dryness, and the residual material is triturated with 20 cc. of water. The insoluble, solid component of the trituration mixture is recovered by filtration, washed thoroughly with water and dried first at room temperature, and finally at 100° C. to give $\Delta^4$-3,20-diketo-11,17-dihydroxy-21-acetoxy-pregnene 3,20-bis-semicarbazone, which is obtained in the form of an amorphous powder; M.P. over 340° C.

*Example 3*

A mixture of about 12 g. of $\Delta^4$-3,20-diketo-11,17-dihydroxy-21-acetoxy-pregnene 3,20-bis-semicarbazone, 240 ml. of chloroform, 160 ml. of tetrahydrofuran, and 400 ml. of 1.25 N aqueous hydrochloric acid is heated under reflux for a period of about four minutes. The resulting clear, two-phase system is cooled to a temperature of about 45° C., and the layers are separated. The aqueous layer is treated successively with two 100 ml.-portions and two 50 ml.-portions of a 3:2 chloroform-tetrahydrofuran solution, the treatment, in each case, consisting of heating the aqueous layer and the chloroform-tetrahydrofuran solution under reflux for a period of four minutes. The spent aqueous layer is then cooled to a temperature of 15° C. and exhaustively extracted with three 50 ml.-portions of a 3:2 chloroform-tetrahydrofuran solution. The chloroform-tetrahydrofuran solutions are then combined, the resulting solution is washed with a saturated aqueous solution of sodium bicarbonate, and the chloroform and tetrahydrofuran in the combined organic layer is replaced with ethyl acetate by evaporation in vacuo. Petroleum ether is added to the residual ethyl acetate solution, and the precipitated material is recovered by filtration and dried to give substantially pure $\Delta^4$-3,20-diketo-11,17-dihydroxy-21-acetoxy-pregnene in a yield of about 95% of that theoretically obtainable.

*Example 4*

A portion of the mother liquor obtained as described in Example 1 hereinabove and containing a mixture of mono and bis-semicarbazones of $\Delta^4$-3,11,20-triketo-17-hydroxy-21-acetoxy-pregnene equivalent to approximately 25 g. of the mono-semicarbazone is mixed with about 400 cc. of 1.0 N aqueous hydrochloric acid and the mixture is stirred at room temperature for a period of about three hours. After this reaction period, the chloroform layer, which forms, is separated and the aqueous layer is extracted with two 35 cc. portions of chloroform. The chloroform solutions are combined, mixed with 400 cc. of 1.0 N aqueous hydrochloric acid, and the resulting mixture is heated under reflux for a period of approximately twenty minutes. The chloroform layer is separated, and the aqueous layer is extracted with two 35 cc.-portions of chloroform.

The chloroform solutions are combined, washed with a 5% aqueous sodium bicarbonate solution which, in turn, is backwashed with chloroform. The combined chloroform solutions are evaporated under reduced pressure, and the chloroform is displaced by acetone. The resulting acetone slurry is filtered, and the insoluble material is washed with acetone and dried to give approximately 20 g. of $\Delta^4$-3,11,20-triketo-17-hydroxy-21-acetoxy-pregnene.

Various changes and modifications may be made in carrying out the present invention without departing from the spirit and scope thereof. Insofar as these changes and modifications are within the purview of the annexed claims, they are to be considered as part of our invention.

We claim:
1. In the process of converting a 4-halo-3,11,20-triketo-17,21-dihydroxy-pregnane compound to both the corresponding $\Delta^4$-3,11,20-triketo-pregnene and the corresponding $\Delta^4$-3,20-diketo-11-hydroxy-pregnene compound in high overall yield, the steps which comprise reacting approximately one molecular equivalent of the corresponding 4-halo-3,11,20-triketo-pregnane with approximately two to four molecular equivalents of semicarbazide in the presence of a liquid medium comprising both (1) a water-immiscible organic solvent selected from the group which consists of hydrocarbon solvents and halogenated hydrocarbon solvents and (2) a highly polar, water-miscible organic solvent, selected from the group which consists of alcohols, N,N-dialkylalkanoamides and lower alkanoic acid nitriles, thereby forming a reaction product comprising mono- and 3,20-bis-semicarbazones of the corresponding $\Delta^4$-3,11,20-triketo-pregnene, precipitating and recovering said $\Delta^4$-3,11,20-triketo-pregnene 3,20-bis-semicarbazone from the mother liquor in crystalline form, converting said compound to said $\Delta^4$-3,20-diketo-11-hydroxy-pregnene, and subjecting said mother liquor containing mono-semicarbazones and residual 3,20-bis-semicarbazone of the $\Delta^4$-3,11,20-triketo-pregnene to the action of a hydrolyzing agent thereby hydrolyzing said mono-semicarbazones and residual 3,20-bis-semicarbazone to form the $\Delta^4$-3,11,20-triketo-pregnene, the total combined yield of said $\Delta^4$-3,11,20-triketo-pregnene and said $\Delta^4$-3,20-diketo-11-hydroxy-pregnene, based on the 4-halo-3,11,20-triketo-pregnane starting material, being substantially quantitative.

2. In the process of preparing both $\Delta^4$-3,11,20-triketo-17-hydroxy-21-acyloxy-pregnene and $\Delta^4$-3,20-diketo-11,17-dihydroxy-21-acyloxy-pregnene in high overall yield starting with 4-halo-3,11,20-triketo-17-hydroxy-21-acyloxy-pregnane, the steps which comprise reacting approximately one molecular equivalent of the 4-halo-3,11,20-triketo-17-hydroxy-21-acyloxy-pregnane with approximately two to four molecular equivalents of semicarbazide in the presence of a liquid medium comprising both (1) a water-immiscible organic solvent selected from the group which consists of hydrocarbon solvents and halogenated hydrocarbon solvents and (2) a highly polar, water-miscible organic solvent selected from the group which consists of alcohols N,N-dialkyl-alkanoamides and lower alkanoic acid nitriles, thereby forming a reaction product comprising mono- and 3,20-bis-semicarbazones of $\Delta^4$-3,11,20-triketo-17-hydroxy-21-acyloxy-pregnene, precipitating and recovering said $\Delta^4$-3,11,20-triketo-17-hydroxy-21-acyloxy-pregnene 3,20-bis-semicarbazone from the mother liquor in crystalline form, converting said compound to $\Delta^4$-3,20-diketo-11,17-dihydroxy-21-acyloxy-pregnene and subjecting said mother liquor containing mono-semicarbazones and residual 3,20-bis-semicarbazone of $\Delta^4$-3,11,20-triketo-17-hydroxy-21-acyloxy-pregnene to the action of an aqueous mineral acid thereby hydrolyzing said mono-semicarbazones and residual 3,20-bis-semicarbazone to form $\Delta^4$-3,11,20-triketo-17-hydroxy-21-acyloxy pregnene, the total combined yield of said $\Delta^4$-3,11,20-triketo-17-hydroxy-21-acyloxy-pregnene and said crystalline $\Delta^4$-3,11,20-triketo-17-hydroxy-21-acyloxy-pregnene 3,20-bis-semicarbazone, based on the 4-halo 3,11,20 - triketo - 17-hydroxy-21-acyloxy-pregnane starting material, being substantially quantitative.

3. In the process of preparing both $\Delta^4$-3,11,20-triketo-17-hydroxy-21-acyloxy-pregnene and $\Delta^4$-3,20-diketo-11,17-dihydroxy-21-acyloxy-pregnene in high overall yield starting with 4-halo-3,11,20-triketo-17-hydroxy-21-acyloxy-pregnane, the steps which comprise reacting approximately one molecular equivalent of the 4-halo-3,11,20-triketo-17-hydroxy-21-acyloxy-pregnane with approximately two to four molecular equivalents of semicarbazide in the presence of a liquid medium comprising both chloroform and dimethyl formamide thereby forming a reaction product comprising mono- and 3,20-bissemicarbazones of $\Delta^4$-3,11,20-triketo-17-hydroxy-21-acyloxy-pregnene, precipitating and recovering said $\Delta^4$-3,11,20-triketo-17-hydroxy-21-acyloxy-pregnene 3,20-bis-semicarbazone from the mother liquor in crystalline form, converting said compound to $\Delta^4$-3,20-diketo-11,17-dihydroxy-21-acyloxy-pregnene and subjecting said mother liquor containing mono-semicarbazones and residual 3,20-bis-semicarbazone of $\Delta^4$-3,11,20-triketo-17-hydroxy-21-acyloxy-pregnene to the action of an aqueous mineral acid thereby hydrolyzing said mono-semicarbazones and residual 3,20-bis-semicarbazone to form $\Delta^4$-3,11,20-triketo-17-hydroxy-21-acyloxy-pregnene, the total combined yield of said $\Delta^4$-3,11,20-triketo-17-hydroxy-21-acyloxy-pregnene and said crystalline $\Delta^4$-3,11,20-triketo-17-hydroxy - 21 - acyloxy-pregnene 3,20-bis-semicarbazone, based on the 4-halo-3,11,20-triketo-17-hydroxy-21-acyloxy-pregnane starting material, being substantially quantitative.

4. The process which comprises subjecting to fractional crystallization a solution containing $\Delta^4$-3,11,20-triketo-17-hydroxy-21-acetoxy-pregnene mono-semicarbazone and $\Delta^4$-3,11,20-triketo-17-hydroxy-21-acetoxy-pregnene 3,20-bis-semicarbazone in a liquid medium comprising both a water-immiscible organic solvent selected from the group which consists of hydrocarbon solvents and halogenated hydrocarbon solvents and a highly polar, water-miscible organic solvent, selected from the group which consists of alcohols, N,N-dialkyl-alkanoamides and lower alkanoic acid nitriles, thereby precipitating the sparingly soluble crystalline $\Delta^4$-3,11,20-triketo-17-hydroxy-21-acetoxy-pregnene 3,20-bis-semicarbazone, and recovering said crystalline $\Delta^4$-3,11,20-triketo-17-hydroxy-21-acetoxy-pregnene 3,20-bis-semicarbazone.

5. The process which comprises subjecting to fractional crystallization a solution containing $\Delta^4$-3,11,20-triketo-17-hydroxy-21-acetoxy-pregnene mono-semicarbazone and $\Delta^4$-3,11,20-triketo-17-hydroxy-21-acetoxy-pregnene 3,20-bis-semicarbazone in a liquid medium comprising chloroform and dimethyl formamide, thereby precipitating the sparingly soluble crystalline $\Delta^4$-3,11,20-triketo-17-hydroxy-21-acetoxy-pregnene 3,20-bis-semicarbazone, and recovering said crystalline $\Delta^4$-3,11,20-triketo-17-hydroxy-21-acetoxy-pregnene 3,20-bis-semicarbazone.

References Cited in the file of this patent

UNITED STATES PATENTS

| | | |
|---|---|---|
| 2,590,978 | Kendall | Apr. 1, 1952 |
| 2,628,966 | Graber | Feb. 17, 1953 |
| 2,656,367 | Graber | Oct. 20, 1953 |
| 2,662,903 | Holysz et al. | Dec. 15, 1953 |
| 2,708,673 | Levin | May 17, 1955 |

OTHER REFERENCES

Kritchevsky et al.: J.A.C.S., vol. 74, pp. 483–86 (1952).

Fridenson: Bull. Soc. Chim. de France, 1956, pp. 1484–1485 and 1498.

Wendler: J.A.C.S., 1951, 73, 3818–3820.